United States Patent
Tittjung

(10) Patent No.: US 6,374,701 B1
(45) Date of Patent: Apr. 23, 2002

(54) GEARLESS DIFFERENTIAL

(75) Inventor: Wendel W. Tittjung, Warren, MI (US)

(73) Assignee: Tractech Inc., Warren, MI (US)

( * ) Notice: Subject to any disclaimer, the term of this patent is extended or adjusted under 35 U.S.C. 154(b) by 0 days.

(21) Appl. No.: 09/422,945

(22) Filed: Oct. 22, 1999

(51) Int. Cl.$^7$ .............................................. F16H 48/12
(52) U.S. Cl. ....................................................... 74/650
(58) Field of Search .................. 74/650, 711; 475/248, 475/249; 192/70.27, 70.28

(56) References Cited

U.S. PATENT DOCUMENTS

| | | | |
|---|---|---|---|
| 2,555,044 A | | 5/1951 | Lewis |
| 4,290,321 A | * | 9/1981 | Wilson .......................... 74/711 |
| 4,400,996 A | | 8/1983 | Schou |
| 4,498,355 A | | 2/1985 | Schou |
| 4,598,609 A | * | 7/1986 | Nellums et al. ............... 74/650 |
| 4,640,143 A | | 2/1987 | Schou |
| 4,735,108 A | * | 4/1988 | Teraoka et al. ................ 74/650 |
| 4,741,407 A | * | 5/1988 | Torii et al. ..................... 180/76 |
| 4,949,594 A | * | 8/1990 | Galhotra ....................... 74/650 |
| 5,413,015 A | | 5/1995 | Zentmyer |
| 5,727,430 A | | 3/1998 | Valente |

FOREIGN PATENT DOCUMENTS

| | | | |
|---|---|---|---|
| EP | 239763 | * 10/1987 | ................... 74/650 |

* cited by examiner

*Primary Examiner*—Dirk Wright
(74) *Attorney, Agent, or Firm*—Lawrence E. Laubscher, Sr.

(57) ABSTRACT

A locking differential includes a pair of opposed collinearly arranged annular clutch members the adjacent faces of which contain corresponding pairs of V-shaped drive grooves for receiving a cylindrical drive pin that is connected with the differential casing, the planar faces of the drive grooves being arranged at an obtuse angle of about 120°. Preferably, in order to obtain line-to-line contact with the drive pin, each of the four planar drive faces of a clutch member has an angle of convergence of about 3.017° relative to the diametrically arranged lines of juncture of the associated pairs of planar drive faces. The clutch members are normally biased apart by helical springs the end portions of which are received in pockets contained in the opposed faces of the clutch members, respectively. Access slots are provided in the outer circumferential surfaces of the clutch members for introducing the ends of the spring members, when the spring members are in an axially compressed assembling condition, into the respective pockets. A locking pin carried by each clutch member on the face thereof opposite the other clutch member extends within a corresponding locking groove that is contained in the opposite face of, and communicates with the outer circumferential surface of, the other clutch member.

4 Claims, 5 Drawing Sheets

PRIOR ART
FIG. 1
PRIOR ART
FIG. 2
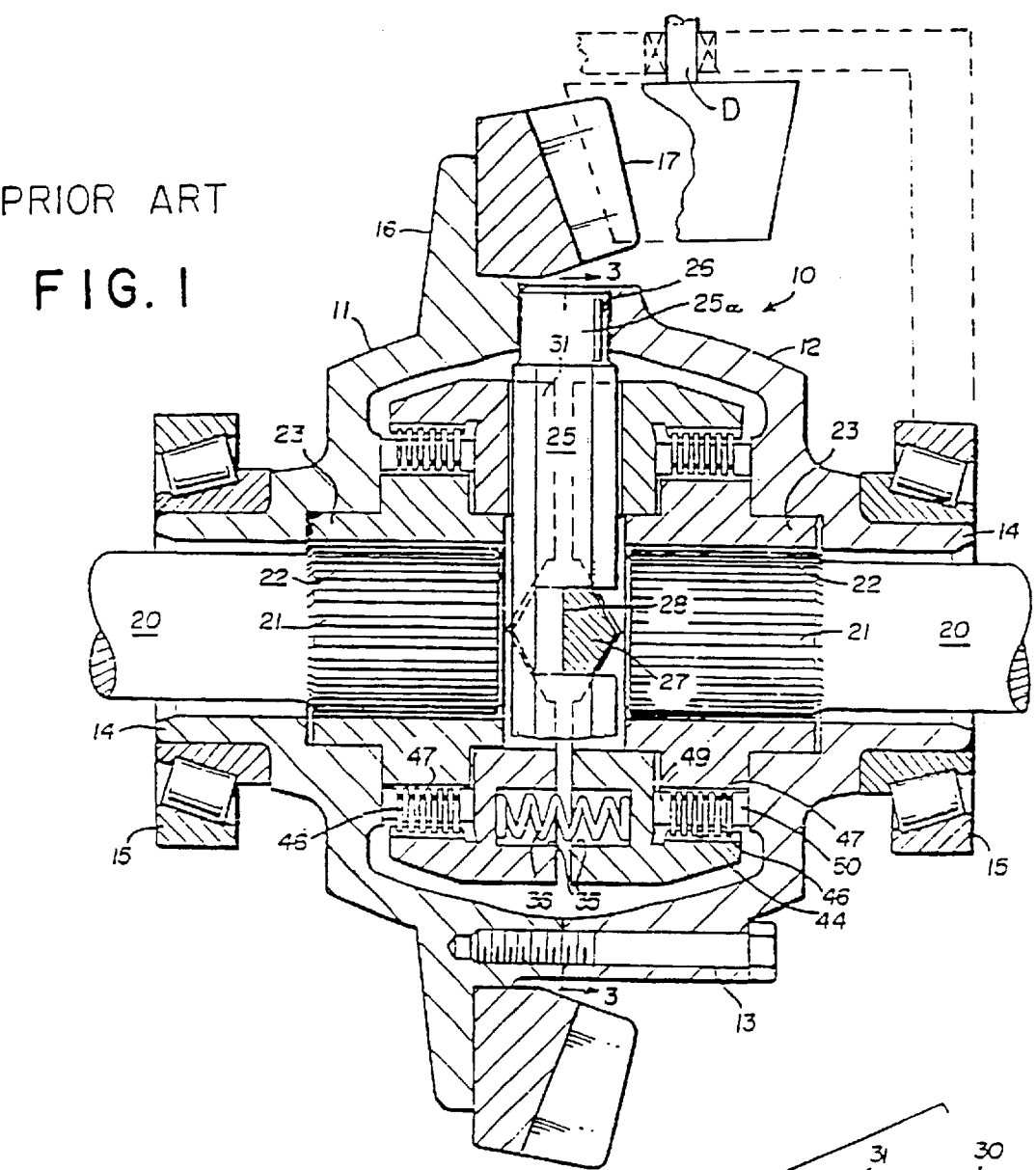
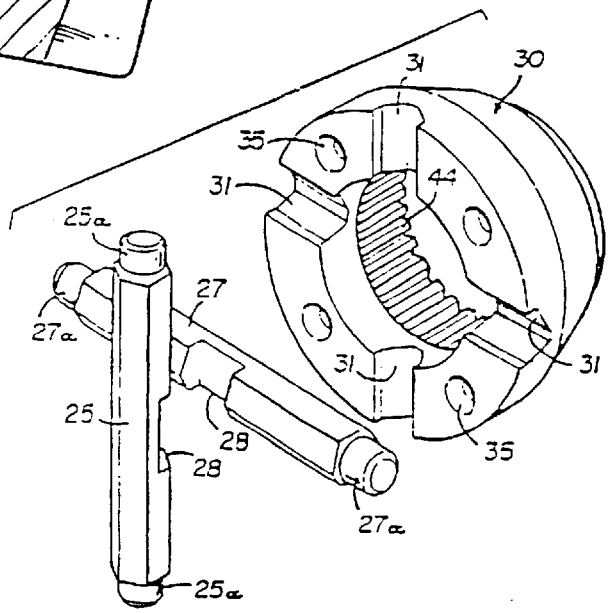

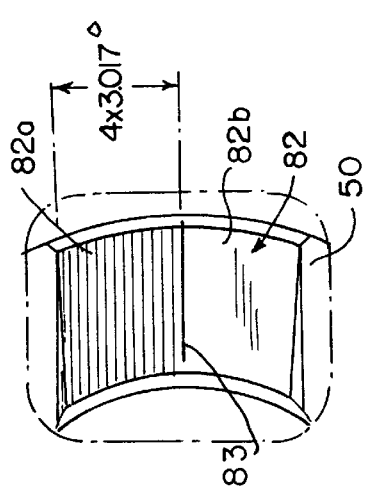
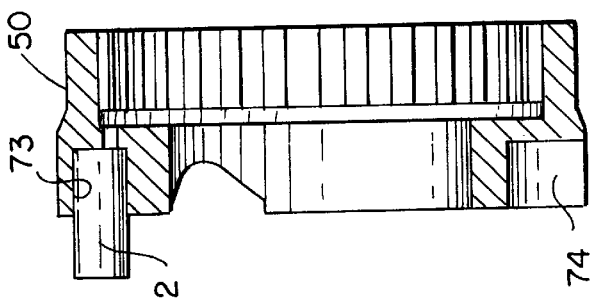
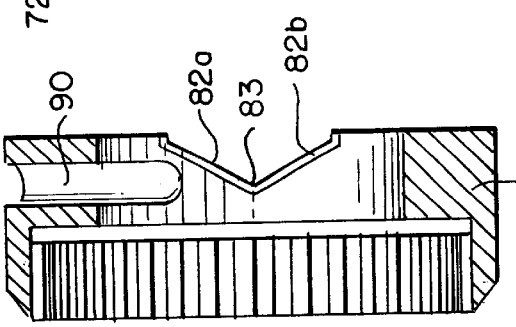
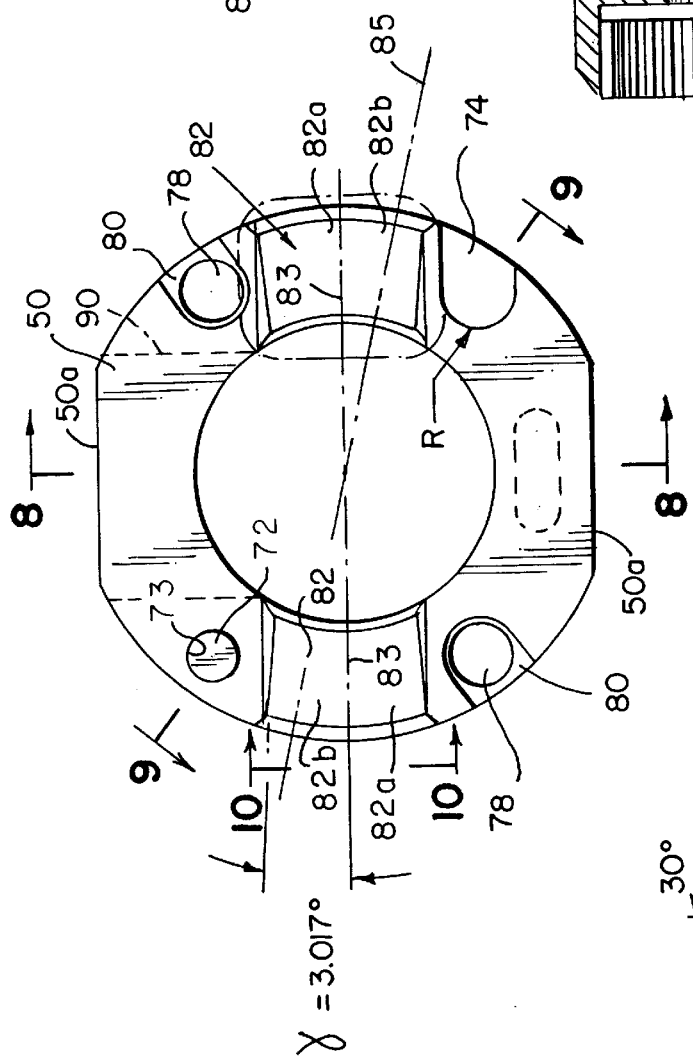
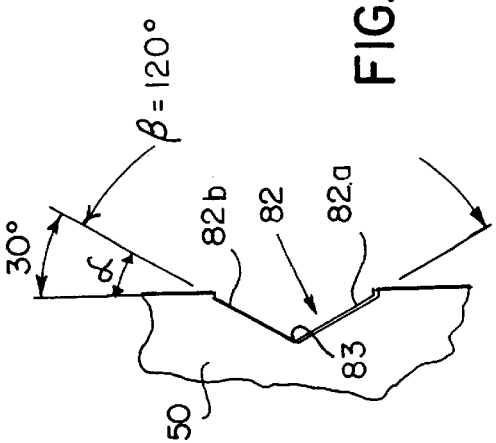

GEARLESS DIFFERENTIAL

BACKGROUND OF THE INVENTION

1. Field of the Invention

A locking differential is disclosed having a cylindrical drive rod and V-shaped drive grooves including planar faces that are arranged at an obtuse angle of about 120° and meet in diametrically arranged junctures. Helical biasing springs are provided having end portions that are mounted within pockets contained in the opposed faces of the clutch members, which spring members are inserted in an axially compressed condition during assembly between the opposed faces of the clutch members via assembling slots that communicate with the outer circumferential surfaces of the clutch members.

2. Brief Description of the Prior Art

Locking differential are well known in the patented prior art as shown by the patents to Lewis U.S. Pat. No. 2,555,044, Schou U.S. Pat. Nos. 4,400,996, 4,498,355, and 4,640,143, and Zentmyer U.S. Pat. No. 5,413,015. In the Schou patents, it was proposed to provide a pair of annular friction pack assemblies for normally connecting the drive shaft with the pair of output shafts, respectively. Upon the occurrence of an overrunning condition in which the rotational velocity of one output shaft exceeds that of the other shaft, the friction pack associated with the overrunning shaft is disengaged, thereby to disconnect the overruning shaft to a free-wheeling condition. In the Zentmyer patent, it was proposed to retrofit a locking differential into the conventional differential casing of a four-wheel vehicle of the like, thereby to permit rugged off-road operation of the vehicle.

In the Valente Patent No. 5,727,430, which is assigned to the same assignee as the present invention, a locking differential is disclosed that is adapted to retrofit into an existing differential casing, such as the original equipment differential casing of a four-wheel drive vehicle or the like, through an access opening contained therein, said differential including a pair of annual friction packs for normally connecting a drive shaft with a pair of driven output shafts. Side gears splined to the output shafts are normally connected with a pair of clutch or coupler members driven by the drive shaft by the friction packs, respectively. The clutch members are biased apart by a plurality of spring biasing assemblies each including a locking pin and a collinearly arranged helical spring, the locking pin being slidably mounted at one end in a bore contained in one face of a first clutch member, said pin extending at its other end in an oversized bore contained in the opposing face of the other clutch member, thereby to permit limited relative angular displacement between the clutch members.

The present invention was developed to provide an improved locking differential that is more easily assembled, of less costly construction, and provides smoother more positive differential operation.

SUMARRY OF THE INVENTION

According to a primary object of the invention, a gearless differential is provided having opposed clutch members containing V-shaped drive grooves that receive a cylindrical drive pin that is carried by the differential housing. The faces of the V-shaped groove are planar and are arranged to provide line-to-line contact with the drive rod.

According to another object of the invention, the clutch members are normally biased apart by a plurality of helical springs arranged longitudinally between the adjacent faces of the clutch members. The ends of the helical springs are received in opposed pockets contained in the opposed faces of the clutch members. Radially extending assembly slots are provided in the outer circumferential surfaces of the clutch members, thereby to permit introduction of the springs, when in an axially compressed condition, between the faces of the clutch members.

BRIEF DESCRIPTION OF THE DRAWINGS

Other objects and advantages of the invention will become apparent from a study of the following specification when viewed in the light of the accompanying drawing, in which:

FIGS. 1 and 2 are sectional and detailed perspective views, respectively, of a known gearless differential of the prior art;

FIG. 7 is a front end view of the coupler or clutch member, and

FIG. 7A is a detailed view of the portion of FIG. 7 enclosed with a solid-dashed line;

FIG. 8 is a sectional view taken along line 8—8 of FIG. 7;

FIG. 9 is a sectional view of the clutch member taken along line 9—9 of FIG. 7 with a locking pin installed thereon;

FIG. 10 is a detailed side elevation view taken in the direction of the arrow A in FIG. 7;

DETAILED DESCRIPTION

Figure 4:
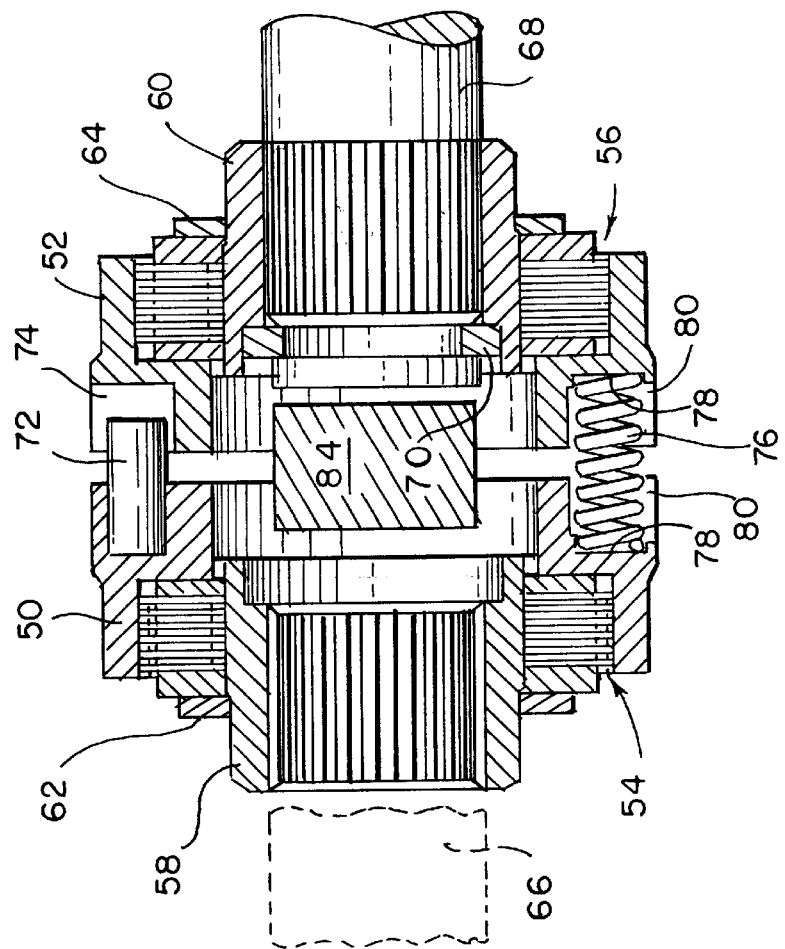
FIG. 4 is a sectional view taken along line 4—4 of FIG. 3.
Figure 3:
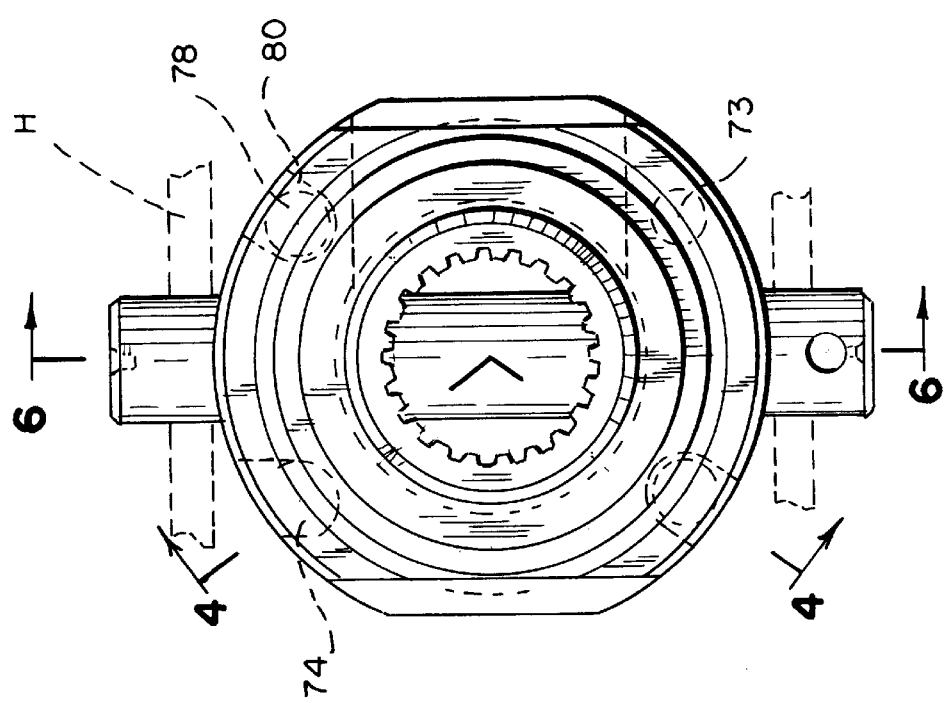
FIG. 3 is an end view of the improved differential of the present invention.

Referring first to FIGS. 1 and 2 which illustrate the prior art locking differential of the Schori U.S. Pat. No. 4,498,355, the annular friction packs 46 serve to normally connect the collars or side gears with the couplers or clutch members 30 when the output axles 20 are driven at the same rotational velocities by the drive shaft D. Springs 36 normally bias the coupling rings 30 apart to compress the friction packs 46 between the coupling rings and the outer anvil rings 50 that engage the inner wall surface of the differential case 10. In the event that either of the two wheel axles 20 speeds up relative to the other wheel axle and the housing, that overrunning axle is momentarily disengaged from and is permitted to freewheel relative to the differential. This is accomplished by the faster moving axle causing its coupling ring to angularly advance relative to the drive rods 25 and 27. Meanwhile, the other coupling ring remains in contact with the drive rod and is driven as before. This relieves the pressure of the rods against the sloped walls of the ring notches and the ring immediately moves inwardly towards the rod. Now that the angularly advanced coupling ring is disengaged from the rods and moves inwardly toward the other ring, the pressure on that ring against its clutch is relieved so that the clutch immediately disengages and the axle collar with the axle are free to rotate or free-wheel without receiving any power from the differential; however, the other axle receives the power. Locking pin means extend with oversized holes contained in the opposed faces of the coupling members to limit the degree of relative angular displacement between the coupling members. When the overrunning condition is terminated, the overrunning coupling ring is returned to its initial position, and the axles are again driven at the same rotational velocity.

Referring now to FIGS. 3–6, the gearless differential of the present invention includes a pair of collinearly arranged clutch members 50 and 52 the remote ends of which are counter bored to receive sets of friction pack means 54 and 56, respectively. Arranged coaxially within the friction pack means 54 and 56 are a pair of annular side gears 58 and 60, respectively. The friction pack assemblies 54 and 56 are retained in place by C-clip means 62 and 64 that extend within an external groove contained in the outer periphery of the side gears, respectively. As is known in the art, a pair of collinearly-arranged output shafts 66 and 68 are splined to the side gears respectively and are locked in place by C-clips 70.

Figure 5:
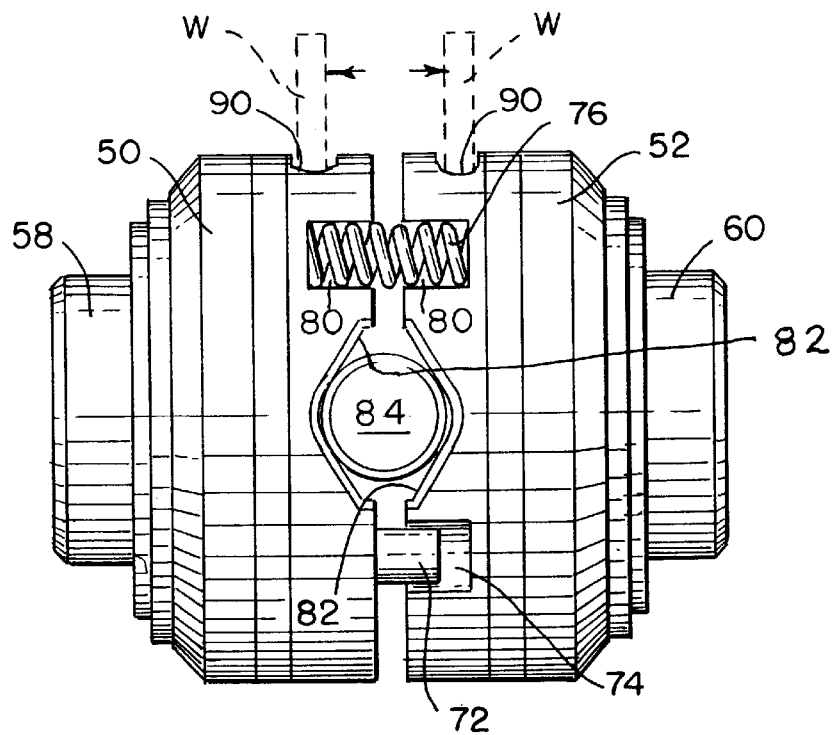
FIG. 5 is a top plan view of the differential of FIGS. 3 and 4.
Figure 6:
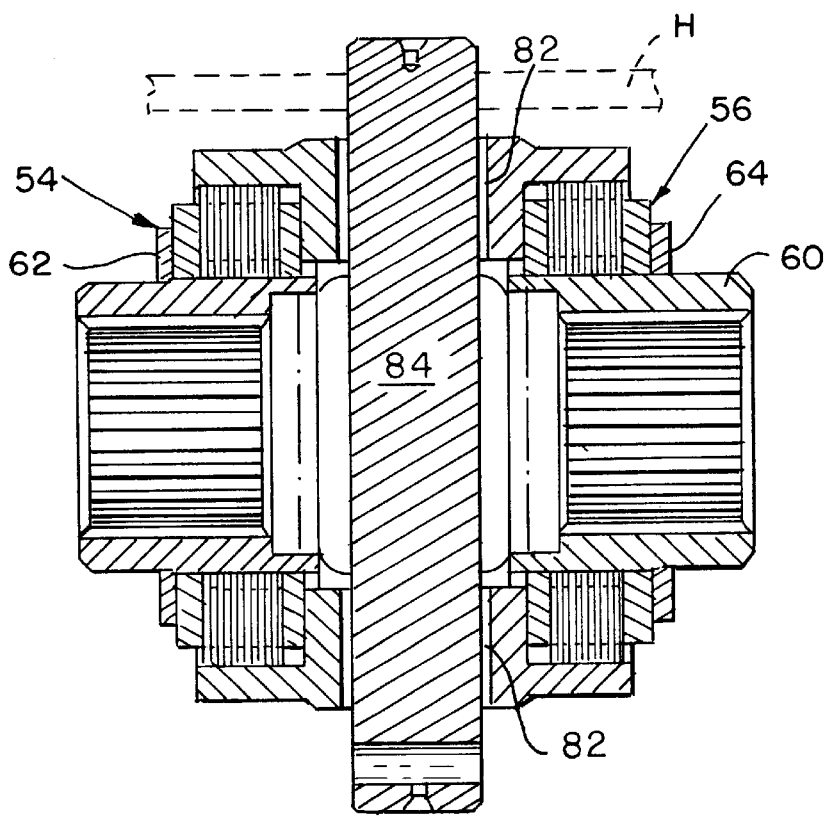
FIG. 6 is a sectional view taken along the line 6—6 in FIG. 3.

As best shown in FIG. 4, a locking pin 72 extends axially from one face of the clutch member 50 into a corresponding oversized slot 74 contained in the opposing face of the clutch member 52. Similarly, a second locking pin (not shown) is diametrically arranged and extends from the second clutch member 52 into a corresponding oversized slot contained in the opposed face of the clutch member 50. A plurality of helical biasing springs 76 are provided that extend between opposed pockets 78 contained in the opposite faces of the clutch members. The springs 76 are compression springs, and in order to permit the assembly thereof, when in an axially compressed condition, between the faces of the clutch members, radial slots 80 are provided that communicate with the outer peripheries of the clutch members. As best shown in FIGS. 5 and 6, the opposed faces of the clutch members also contain opposed pairs of V-shaped drive grooves 82 having planer wall surfaces and between which is arranged a cylindrical drive rod 84. As is known in the art, the drive rod 84 is removably mounted in opposed corresponding bores contained in the housing H of the differential.

Referring to FIG. 7, it will be seen that the bore 73 for receiving the locking pin 72 is diametrically arranged relative to the slot 74 that receives the locking pin on the other clutch member. It will also be seen that diametrically opposed external portions 50a of the clutch members are flattened to permit insertion of the clutch members within openings contained in the side walls of the housing H. As shown in FIG. 7A the walls 82a and 82b of each of the V-shaped grooves 82 are planar and are arranged at a ramp angle γ relative to the radial planes defined by the line of juncture 83 and the lines defined by the projection of the sides of the groove on the outer circumferential surface of the clutch member, respectively, thereby to give line contact 85 between the drive rod 84 and the clutch housing from the inside diameter to the outside diameter. This line contact 85 reduces stress risers that are caused from point contact, thereby extending the life of the unit. In the illustrated embodiment, the ramp angle γ is 3.017°. As will be discussed below with respect to FIG. 5, the clutch members are also provided with a pair of corresponding radially inwardly directed assembly slots 90 that are adapted to receive wedges W during the assembly of the gearless differential within the user's housing.

Figure 13:
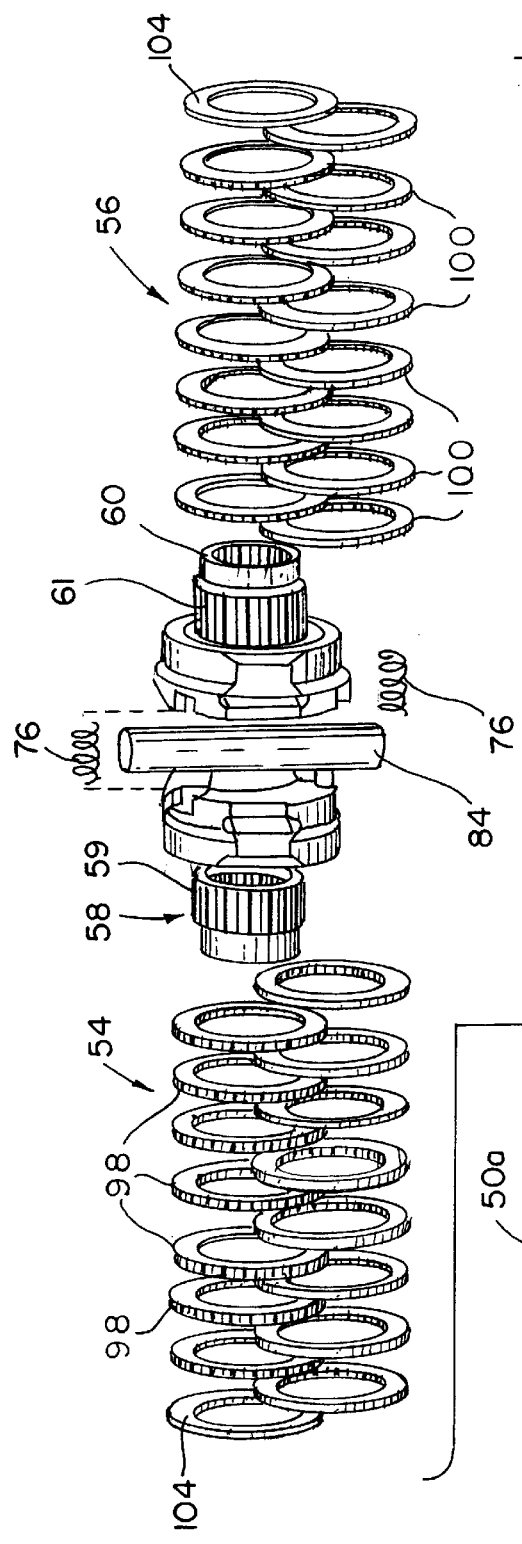
FIG. 13 is and exploded view of the gearless differential.
Figure 12:
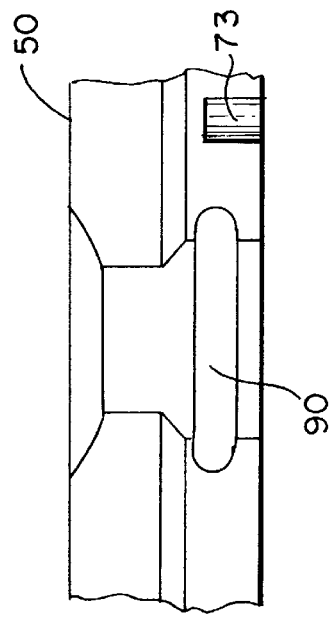
FIGS. 11 and 12 are rear end and top plan views of the clutch member of FIG. 7.
Figure 11:
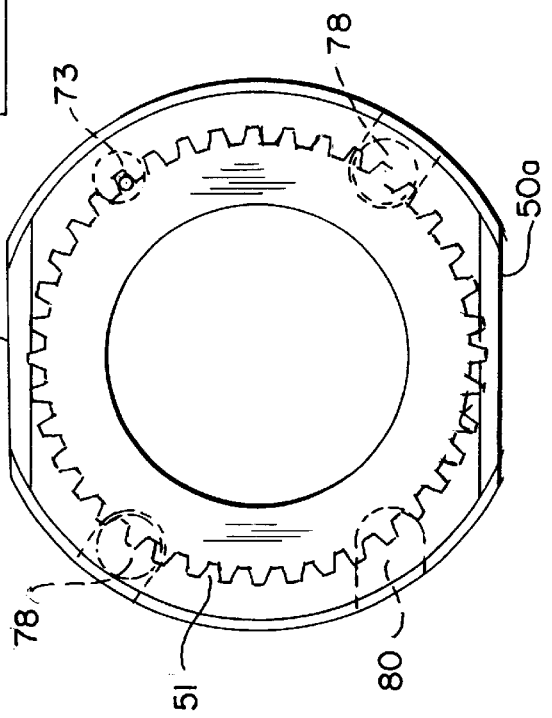

As shown in FIG. 11, the internal surface of each clutch member is splined to define splines 51 that are non-rotatably connected with the alternately arranged friction disk members 98 of the friction pack means 54 and 56. The remaining alternate friction disks 100 are splined to the splined surfaces 59 and 61 of the side gears 58 and 60, respectively. As shown in the exploded view of FIG. 13, end disks 104 are provided that are engaged by the C-clip means 62 and 64 to retain the friction pack assemblies in place.

Operation

In operation, upon rotation of the differential housing H by the drive pinion and drive shaft of the vehicle, not shown, drive rod 84 is displaced relative to the side walls of the V-shaped grooves to compress the friction pack means 54 and 56 and thereby drive the output shafts 66 and 68. In the event that one driven shaft rotates at a higher velocity than the other, the corresponding clutch member is angularly displaced relative to the drive rod 84, whereupon the associated friction pack means is no longer compressed, and the output shaft associated therewith is disengaged from the differential. When the overruning shaft reaches a velocity equal to the velocity of the other driven shaft, the drive rod will be returned to its drive position relative to both of the clutch members.

In accordance with an important feature of the invention, in order to retrofit the differential within the user's differential housing, the old differential components are removed, and the new clutch members and friction pack assemblies are inserted within the differential housing via the enlarged side openings contained therein. During the installation of the clutch members, the flat portions 50a permit introduction via the wall openings contained in the differential housing. After the clutch members and side gears, with the friction pack assemblies mounted thereon, are introduced within the chamber of the user's housing, wedge means W are inserted within the assembly slots 90, whereupon the clutch members are displaced axially apart as shown by the arrows in FIG. 5. The helical compression springs are then introduced between the faces of the clutch members via the circumferential openings 80, the helical springs being axially compressed by suitable tool means, not shown. When the springs are introduced within the clutch members to locations opposite the pockets 73, the compression on the springs is removed, and the springs expand into engagement with the respective spring pockets 73.

The provision of the locking pins premounted on the clutch housings with mating slots on the opposed gear members permits the assembly of the gearless differential through the large window in the user's differential case. The last assembly step includes the final installation of the helical springs, which makes the overall installation faster and easier.

Preferably, the friction and reaction plates of the friction pack means are formed of pre-hardened SAE1074-1075 spring steel, and are subjected to an "inonitriting" heat treatment process as the final step of manufacture.

While in accordance with the provisions of the Patent Statutes the preferred form and embodiment of the invention have been illustrated and described, it will be apparent to those skilled in the art that various changes may be made without deviating from the inventive concepts set forth above.

What is claimed is:

1. A locking differential for driving a pair of collinearly-arranged axially-spaced output shafts the adjacent ends of which are splined and extend through aligned shaft openings contained in the opposed walls of a hollow differential casing, said casing containing an access opening affording access to the casing chamber, comprising:

(a) a pair of generally annular collinearly-arranged axially-spaced clutch members adapted for insertion within the casing chamber via the casing access opening to positions axially aligned with the axis of the casing shaft openings, the adjacent opposing faces of said clutch members containing at least one pair of diametrically arranged drive grooves;

(b) a pair of generally annular side gears collinearly arranged with, and on opposite sides of, said clutch members, said side gears being internally splined for connection with the output shafts, respectively, the remote ends of said clutch members containing counter bores having a greater diameter than the outer diameter than the outer diameter of the side gears, the adjacent ends of said side gears extending inwardly within said counter bores, respectively, the side walls of said counter bores and the external surfaces of said side gears being splined;

(c) a pair of annular friction pack means mounted in said counter bores concentrically about said side gears, respectively, each of said friction pack means including a plurality of stacked friction discs alternate ones of which are internally spline-connected with said side gears and are externally spline-connected with said clutch member counter bore walls, respectively;

(d) means limiting the extent of outward axial displacement of said side gears relative to said friction pack means, respectively;

(e) locking means limiting the extent of angular rotational displacement of said clutch members relative to each other; and (f) spring means biasing said clutch members outwardly apart toward the associated chamber opposed walls, respectively, thereby to compress said friction pack means to connect said clutch members with their associated side gears, respectively;

(g) a drive rod (84) arranged diametrically between said clutch members and extending within said drive grooves, respectively, the remote ends of said drive rod extending radially outwardly beyond said clutch members for fixed connection with said casing, said drive rod being cylindrical and having a uniform smooth cylindrical surface throughout its length;

(h) said drive grooves being V-shaped to define an obtuse angle of diversity ($\beta$), said grooves having planar side walls (82a, 82b) joined by a line of juncture (83) that extends radially of the clutch member, said side walls being inclined at an acute ramp angle ($\gamma$) relative to the radial planes that pass through the line of juncture (83) and the edges of the grooves at the outer circumferential surface of the clutch member, respectively, thereby to maintain line contact between the drive rod and the clutch housing from the inside diameter to the outside diameter, whereby the life of the locking differential is extended.

2. The locking differential defined in claim 1, wherein said acute ramp angle is 3.017°.

3. A locking differential as defined in claim 1, wherein said spring means comprises a plurality of helical springs arranged axially between said clutch members, each of said helical springs having end portions mounted in opposed recessed pockets contained in the adjacent faces of said clutch members adjacent the outer circumferential surfaces thereof, respectively, said clutch member outer circumferential surfaces containing opposed access slots for introducing the ends of said springs into said pockets when said springs are in axially compressed assembling conditions, respectively.

4. A locking differential as defined in claim 1, wherein said locking pin means comprises a locking pin (72) carried by each clutch member on the face thereof opposite the other clutch member, said locking pin being arranged adjacent the periphery of said clutch member face, said face containing a locking groove (74) arranged diametrically opposite said locking pin and in communication with the circumferential surface of the associated clutch member, said clutch members being arranged to cause the locking pin of one clutch member to extend into the locking groove of the other clutch member.

* * * * *